United States Patent
Griffiths

(10) Patent No.: US 7,177,409 B2
(45) Date of Patent: Feb. 13, 2007

(54) SYSTEMS AND METHODS FOR PROVIDING CALLING PLAN INFORMATION

(75) Inventor: Michael Griffiths, Duluth, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 524 days.

(21) Appl. No.: 10/336,588

(22) Filed: Jan. 3, 2003

(65) Prior Publication Data

US 2004/0131166 A1    Jul. 8, 2004

(51) Int. Cl.
*H04M 15/00*    (2006.01)
*H04M 11/00*    (2006.01)

(52) U.S. Cl. .............................. 379/114.2; 379/114.15; 379/114.17; 455/406

(58) Field of Classification Search ........... 379/114.01, 379/114.15, 114.17, 114.2, 114.28, 114.29, 379/120, 133; 455/405, 406, 408
See application file for complete search history.

(56) References Cited

U.S. PATENT DOCUMENTS

| | | | | |
|---|---|---|---|---|
| 5,146,491 A | * | 9/1992 | Silver et al. ........... | 379/114.24 |
| 5,559,871 A | * | 9/1996 | Smith ..................... | 379/115.01 |
| 5,677,945 A | * | 10/1997 | Mullins et al. ......... | 379/114.17 |
| 5,825,863 A | * | 10/1998 | Walker .................... | 379/114.2 |
| 6,694,000 B2 | * | 2/2004 | Ung et al. ............... | 379/114.2 |
| 6,741,687 B1 | * | 5/2004 | Coppage .................. | 379/114.2 |
| 6,748,066 B1 | * | 6/2004 | Espejo et al. ............ | 379/114.2 |
| 6,873,690 B2 | * | 3/2005 | Moon et al. ............. | 379/114.2 |
| 2003/0008635 A1 | * | 1/2003 | Ung et al. ................. | 455/408 |
| 2004/0198316 A1 | * | 10/2004 | Johnson .................... | 455/406 |

* cited by examiner

*Primary Examiner*—Quoc Tran
(74) *Attorney, Agent, or Firm*—Lee & Hayes, PLLC

(57) ABSTRACT

Calling plan information is provided whenever a user makes a call that fits within the plan. The user may be assigned an account related to the calling plan with information associated with the account. The information may include a time function such as the time remaining until expiration of the calling plan or the time used in the calling plan. A call made from an originating number that is associated with the calling plan triggers the provision of information. After the information is provided, the call may be routed to a terminating number as dialed by the user. After the call, the information associated with the calling plan may be updated.

23 Claims, 3 Drawing Sheets

SYSTEMS AND METHODS FOR PROVIDING CALLING PLAN INFORMATION

FIELD OF THE INVENTIONS

The inventions generally relate to the field of telecommunications, and more particularly, relate to the field of information delivery regarding telecommunications services.

BACKGROUND OF THE INVENTIONS

A customer of a long distance telephone service provider may be charged for long distance service based on the features of each long distance call such as the time of day of the call, the length of the call, the destination of the call, etc.

Alternatively, the customer may choose to take advantage of a calling plan offered by the service provider. For example, the customer may subscribe to a calling plan that provides him or her with a set period of time of long distance service during a particular month (or other time measure) at a specified cost. The customer pays the specified cost even if the customer does not use up all of his or her allowed time in the month. On the other hand, if the customer uses up more than the allowed time, the customer may be subject to extra or even premium charges. In some cases, the customer may be prevented from using more than the set period of time. If, for example, the customer is in the middle of a long distance call and the set period of time runs out, then some service providers may cut-off the call.

As yet another alternative for obtaining long distance telecommunication services, a customer may purchase a pre-paid calling card. Unlike the typical calling plan described above, the customer may make use of the pre-paid calling card from almost any telephone number. Also unlike the typical calling plan, the customer generally does not have to use up the time allowed by the pre-paid calling card within a month or some other limited amount of time. Nonetheless, there may be some expiration date of a pre-paid calling card. Like the calling plan, the pre-paid calling card provides the customer with a set period of time of service for a specified cost.

As a result of the limitations of calling plans and pre-paid cards, the customer may strive to keep his or her use of long distance service to just under the set period of time allowed by the calling plan or pre-paid calling card. If the customer uses too much time, there are financial consequences or even an interruption in service. But if the customer uses too little time, then the customer may not be getting the most value out of the calling plan or pre-paid calling card.

There are difficulties, however, in determining how much time of a calling plan or a pre-paid calling card has been used up or is available. The customer could keep track of the allowed time. Whenever the customer made a call, the customer could time the length of each call and accumulate the call lengths to determine how much of the allowed time has been used up. But having to time each call is inconvenient, inefficient, and distracting. Moreover, people other than the customer, like the customer's family, may be making calls. It would be difficult to keep track of everybody's calls.

Another way to keep track of the time available or used in a calling plan or pre-paid calling card is to contact the service provider. Obviously, the service provider keeps track of allowed time so as to cut-off a customer who has exceeded a limit or to assess extra charges. Typically, the service provider designates a particular telephone number to be used by a customer to find out the balance of time remaining or time used up. The customer calls the particular telephone number, and may be requested to enter his or her telephone number subject to the calling plan. In the case of a pre-paid calling card, the customer may have to enter the number assigned to the pre-paid calling card. In addition, the customer may have to provide identification such as a password or personal identity number (PIN). Thus, in addition to the 7 or 10 digits necessary to make the call to the service provider, the customer may have to enter another 7 or 10 digits to identify his or her telephone number or pre-paid calling card, and may have to enter additional digits to provide a password or PIN. Moreover, the customer has to repeat this process each time the customer desires to know how much time may be left in his or her calling plan or pre-paid calling card. This method of keeping track of the available time in a calling plan or a pre-paid calling card is cumbersome, wastes time, and is inconvenient.

Accordingly, there is a need for providing information to a customer about his or her calling plan. In particular, there is a need for providing a customer with information about the time remaining or used-up in a calling plan. There also is a need to provide the customer with the calling plan information in a convenient fashion so the customer does not have to keep track of the allowed time himself or herself, does not have to make separate calls to a service provider, and does not have to provide a lot of information as a requisite to obtaining the calling plan information.

SUMMARY OF THE INVENTIONS

The inventions satisfy the needs described above by methods and systems that provide calling plan information whenever the user makes a call that fits within the plan. Advantageously, a user does not have to keep track of the allowed time, and does not have to call a particular number or access code to obtain the calling plan information. Also, the user does not have to have a prepaid or other calling card.

Generally described, the inventions include an exemplary method that assigns the user an account related to his or her calling plan. Information regarding the calling plan is associated with the account. The information may include a time function such as the time remaining until expiration of the calling plan or the time used in the calling plan.

The exemplary method of providing information to the user is triggered by a call being made from an originating number that is associated with the calling plan of the user. Typically, the call is made from the user's telephone. The call may be a toll call such as a long distance call. When the user makes a call, the information regarding the calling plan is obtained and provided to the call. The information may be provided to the call prior to the routing of the call. After the information is provided, the call may be routed to a terminating number dialed by the user.

The exemplary method also includes actions for updating the information regarding the calling plan of the user. The method may update the account regarding the calling plan with data on the call made by the user so as to result in updated information being associated with the account. The data may include the length of the call. So the updated information may include an updated time function based on the length of the call.

The inventions also include an exemplary system for providing information regarding a calling plan of the user. The exemplary system is set in an Advanced Intelligent Network (AIN). Per this exemplary system, an element such as an intelligent peripheral (IP) that is accessible to a service control point (SCP) in the AIN keeps track of information regarding the calling plan of the user. The intelligent peripheral may be referred to as a peripheral device. The information may include a time function of the calling plan such as the time remaining until expiration of the calling plan or the time used of the calling plan.

When a service switching point (SSP) in the AIN determines that the user is making a call (or making a specific type of call such as a toll call), the SSP requests the SCP for instructions regarding the call. The SCP may obtain the information regarding the calling plan from the element. The SCP then may respond to the SSP with the instructions including the information regarding the calling plan of the user. The SSP responds to the instructions by providing the information to the user. The SSP then may route the call.

In an alternate exemplary system, the SCP may respond to the SSP's request for instructions regarding the call by instructing the SSP to contact another element (such as a service node (also referred to as a service circuit node), or other intelligent peripheral) for the information. The SSP may contact the element and may connect the call to the element. In response to the contact from the SSP and the connection of the call, the element may provide the information regarding the calling plan of the call. The element then may indicate to the SSP that the information has been provided to the call. In response to the indication from the element, the SSP may disconnect the call from the element, and route the call according to the number dialed by the user.

In sum, the inventions include methods and systems that store information about a user's calling plan. When the user places a call, information is provided by way of an announcement or otherwise. The user's call then is routed to the number dialed by the user. Advantageously, the user does not have to keep track of the allowed time. The user does not have to call a special code or access number or have a prepaid or other calling card to obtain the calling plan information. The information is provided to the user whenever he or she makes a call number that fits the calling plan.

Other features and advantages of the inventions may be more clearly understood and appreciated from a review of the following detailed description and by reference to the appended drawings and claims.

DETAILED DESCRIPTION

The inventions include methods and systems that provide calling plan information when a user makes a call that fits within the plan. To implement the inventions, the user may be assigned an account related to the calling plan with information associated with the account. The information may include a time function such as the time remaining until expiration of the calling plan or the time used in the calling plan.

Figure 1:
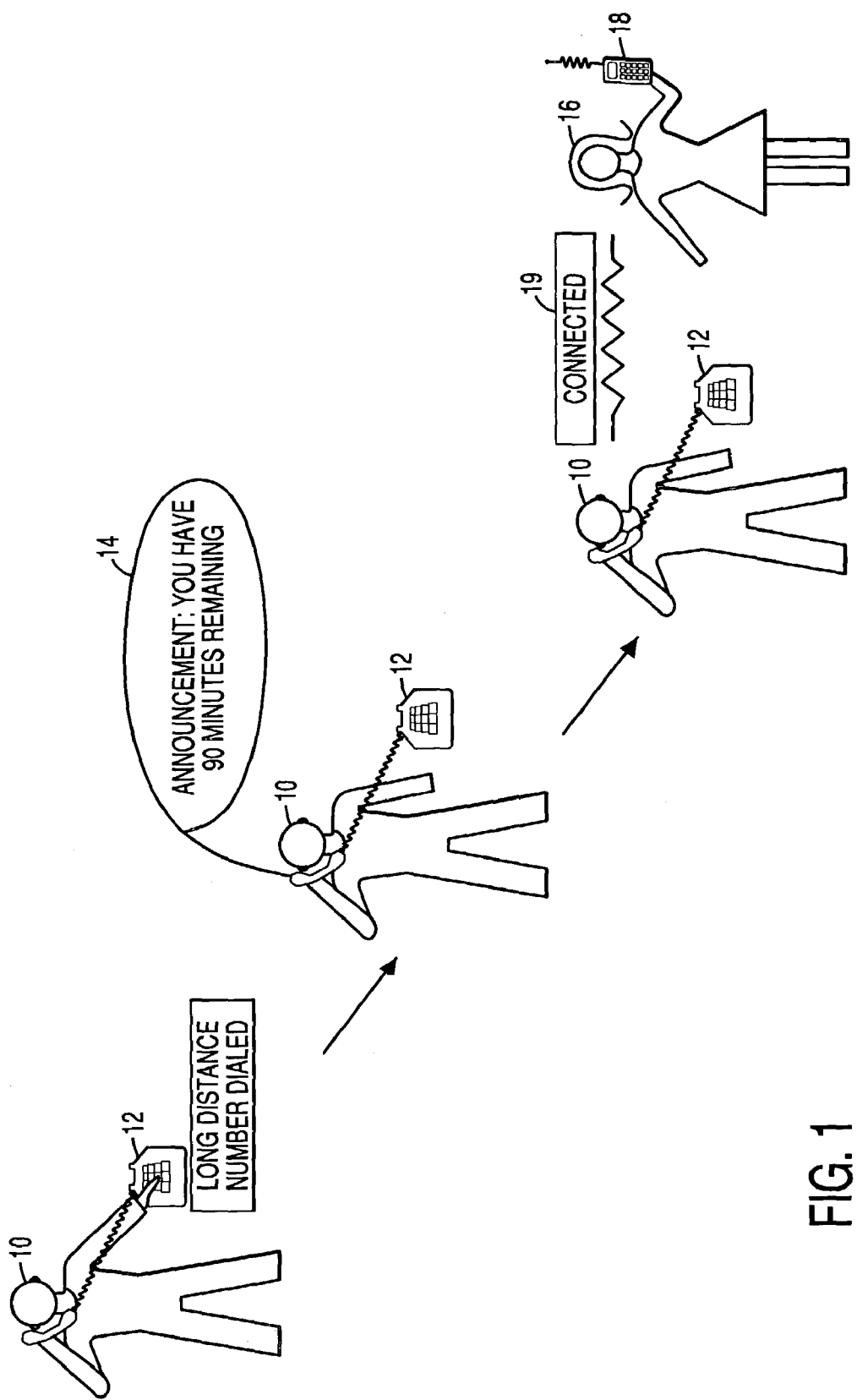
FIG. 1 is a diagram illustrating actions of an exemplary embodiment of the inventions.

Referring to FIG. 1, when the user 10 initiates a call made from an originating number that is associated with the calling plan, the provision of calling plan information is triggered. For example, upon use of a telephone 12 by the user 10 to dial a long distance number, the inventions take action to obtain the calling plan information and present it to the user 10. For example, after the user 10 dials the long distance number, the user 10 may be provided with an announcement 14 including the calling plan information. In this example, the announcement 14 states: "You have 90 minutes remaining." In other words, the user 10 has 90 minutes of telecommunications service left in the calling plan.

After the user 10 is provided with the calling plan information, the call dialed by the user 10 may be routed to the number dialed by the user 10. In this example, the user 10 has dialed the long distance number of a friend 16 using a wireless unit 18. Thus, after the announcement 14, the user's call is routed to the friend's wireless unit 18, and if appropriate, is connected 19. After the call, the information associated with the calling plan may be updated.

Advantageously, the user 10 did not have to take any special steps or actions to obtain information about the calling plan. The user 10 simply used a device (the telephone 12) associated with the user's calling plan to dial a call (within the calling plan) to a long distance number of a friend 16. In response to a determination that the user 10 was making the call, the inventions provided the user 10 with the calling plan information 14.

Figure 2:
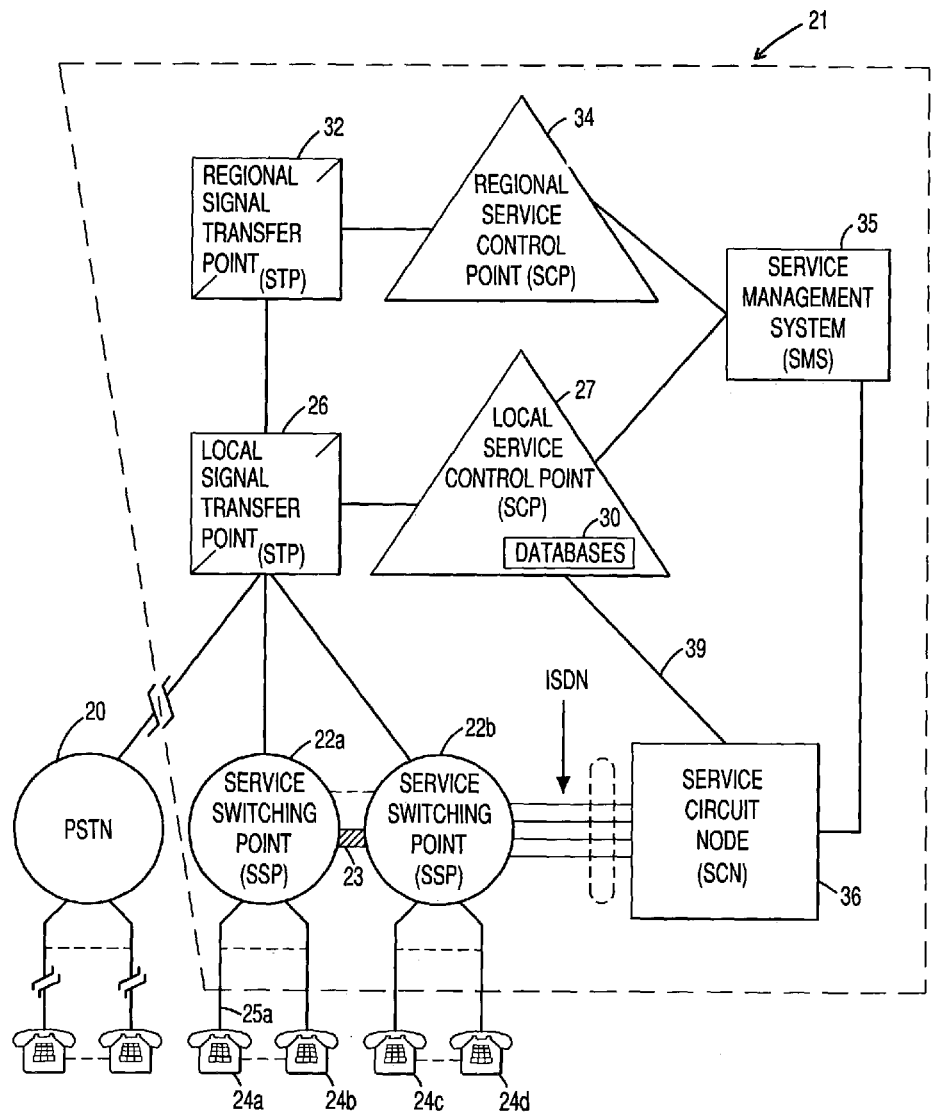
FIG. 2 is a diagram of an exemplary environment for the inventions.

An Exemplary Environment—FIG. 2

Exemplary embodiments of the invention may be operated in an environment including the public switched telecommunication network (PSTN) 20 with elements of an Advanced Intelligent Network (AIN) 21. For brevity, only a basic explanation of the AIN 21 is provided herein. Where the AIN 21 operates or is composed differently in an important aspect from that which would be understood by those skilled in the art, additional details are provided herein. For further information regarding the referenced AIN 21 and aspects thereof, the interested reader is referred to the commonly assigned patent to Weisser, U.S. Pat. No. 5,430,719, which is incorporated herein by reference.

The AIN 21 includes a variety of interconnected network elements. A group of such network elements includes the plurality of central offices which are indicated as service switching points (SSPs) 22a, 22b in FIG. 2. An SSP typically includes switch functionality, but also includes other functionality so as to communicate with other AIN elements. As further illustrated in FIG. 2, the SSPs 22a, 22b have a plurality of subscriber lines connected thereto. A subscriber line may also be referred to as a calling line. Each SSP serves a designated group of lines (also referred to as "calling lines") and thus, the SSP that serves a particular calling line may be referred to as its serving SSP. Each line is connected typically to a piece of terminating equipment including a plurality of telephones commonly referenced as 24 and individually referenced as 24a, 24b, 24c and 24d. Although telephones are illustrated as the pieces of terminating equipment in FIG. 2, such pieces may include other telecommunication devices such as facsimile machines, computers, modems, etc. Each active line in an AIN is assigned a ten digit number commonly referred to as a telephone number or a line number.

Referring again to FIG. 2, SSPs 22a, 22b are interconnected by a plurality of trunk circuits 23. These are the voice path trunks that interconnect the SSPs to connect communications. The term "communication" or "call" is used herein to include all messages that may be exchanged between caller and called party in the network illustrated in FIG. 2.

Each of the SSPs 22*a*, 22*b* is typically connected to another type of AIN element referred to as a local signal transfer point (STP) 26 via respective data links. Currently, these are data links employing a signaling protocol referred to as Signaling System 7 (SS7). Much of the intelligence of the AIN resides in yet another type of AIN element referred to as a local service control point (SCP) 27 that is connected to STP 26 over an SS7 data link. Among the functions performed by the SCP 27 is the maintenance of network databases and subscriber databases as represented collectively by databases 30. These databases may be used in providing services to a customer. Typically, the SCP 27 is also the repository of service package applications (SPAs) that are used in connection with or as part of the databases 30 in the application of advanced services or enhanced features.

Referring again to FIG. 2, the local STP 26 may be connected to other network elements through a regional STP 32, which in turn, may be connected to a regional SCP 34. Both regional SCP 34 and local SCP 27 are connected via respective data links to a service management system (SMS) 35. The SMS 35 interfaces to business offices of the local exchange carrier and interexchange carriers.

In order to keep the processing of data and calls as simple as possible, a set of triggers is defined at the SSPs. A trigger in the AIN is an event associated with a particular line that generates a packet to be sent to an SCP. The trigger causes the SCP to query its databases, service package applications, or other elements or devices for processing instructions with respect to the particular call. The results are sent back to the SSP in a response from the SCP 27 through STP 26. The return packet includes instructions to the SSP as to how to process the call. The instructions may be to take some special action as a result of a customized calling service or enhanced feature. In response, the SSP moves through its call states, collects the called digits, and generates further packets that are used to set up and route the call. Similar devices for routing calls among various local exchange carriers are provided by regional STP 32 and regional SCP 34.

As illustrated in FIG. 2, the AIN 21 also includes an intelligent peripheral 36 (IP), such as a service circuit node (SCN) or service node (SN). The IP 36 includes voice and dual tone multi-frequency (DTMF) signal recognition devices and voice synthesis devices. IP 36 is connected to the local SCP 27 via data link 39 using an X.25 protocol and to the SMS 35 via a data link. In addition, IP 36 typically is connected to one or more (but usually only a few) SSPs via Integrated Service Digital Network (ISDN) links as shown by the connection to SSP 22*b*.

Figure 3:
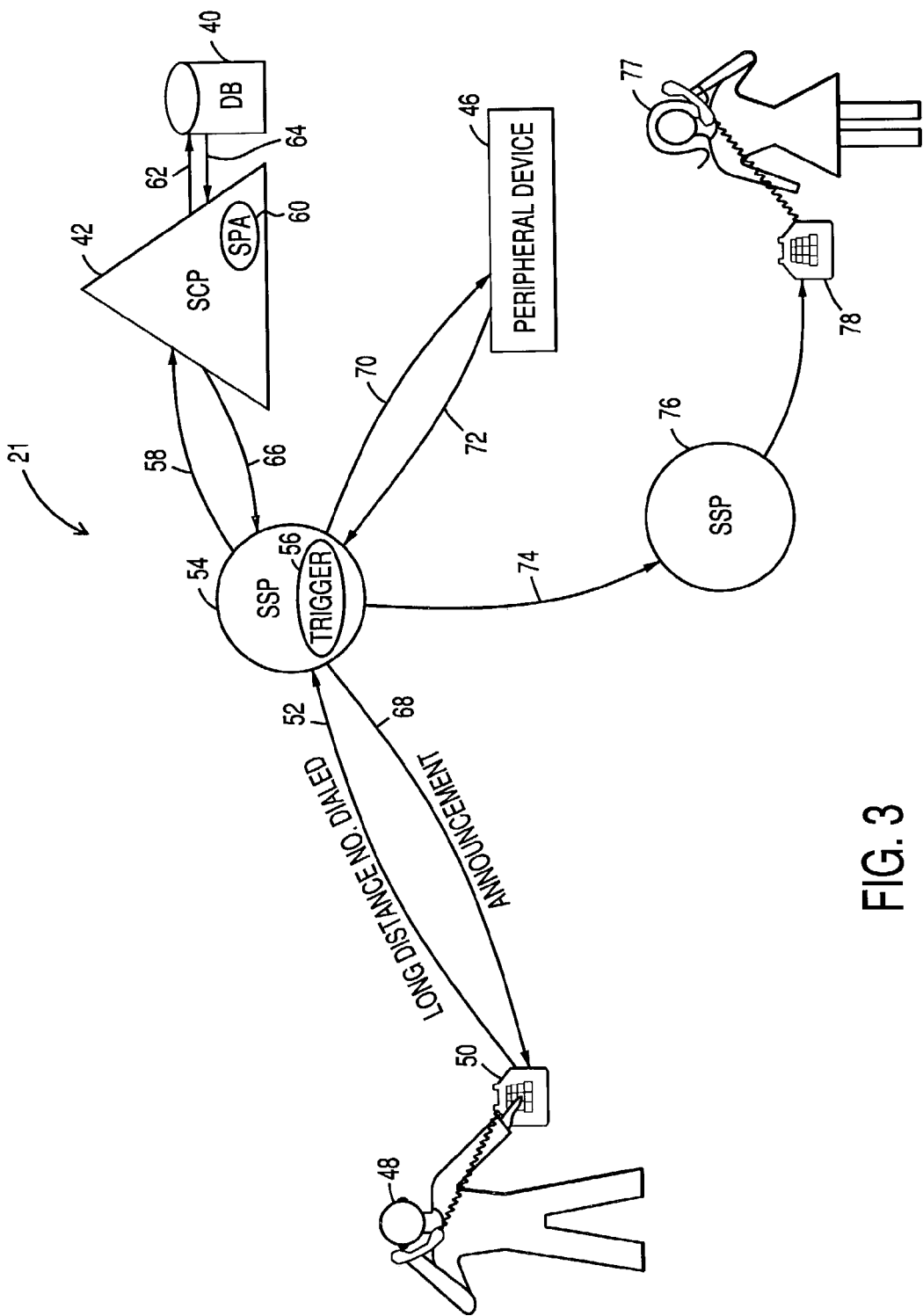
FIG. 3 is a diagram including elements of the exemplary environment and illustrating actions of an exemplary embodiment of the inventions.

Exemplary Operation—FIG. 3

FIG. 3 illustrates the operation of two alternative embodiments of the inventions in the AIN environment 21. If a user subscribes to a calling plan, information about the user's calling plan may be entered and kept track of in an element such as a database 40 accessible to a service control point (SCP) 42. Alternatively, the information about the user's calling plan may be entered and kept track of in an element such as an intelligent peripheral (IP) 46 (also referred to as peripheral device or element) connected to the AIN 21. In addition, a trigger may be set in the SSP serving the user's line to detect user's use of telecommunication services under the calling plan.

In other words, when a user subscribes to a calling plan, information about the user may be entered in an element (such as a database accessible to or part of a service control point (SCP) or an intelligent peripheral (IP) such as the peripheral device 46). The information may be entered into an account and may include details relating to the user such as the telephone number(s) (also referred to as directory number(s) or calling line number(s)) associated with the plan, and other provisions relating to the plan. These other provisions may include time function information related to the calling plan of the user.

For example, the user may have subscribed to a calling plan that provides him or her 120 minutes of long distance service during the course of a month in exchange for a set fee. As part of the provisioning of the user, the SSP serving the user's line may be provisioned with a trunk-based trigger (such as a Network Busy trigger) to determine when the user makes a long distance call. The element (the SCP 42, the peripheral device 46, or other device) including the calling plan information of the user may be provided with data relating to the user's on-going use of telecommunication services. Based on the provided data, the element may update the calling plan information. In particular, the time function of the calling plan information may be updated to reflect the user's on-going use of telecommunication services.

After the provisioning of the user's information regarding a calling plan in the element, the user may expect calling plan information to be provided to him or her whenever he or she dials a call that fits within the calling plan. For example, assume the user's calling plan only covers long distance (or other toll) calls. Whenever the user dials a long distance call, the user is provided with calling plan information. The user is not provided with calling plan information if he or she dials any other type of call such as a call to a local number, a 911 call, etc. Typically, the calling plan information is provided to the user prior to the user's call being routed to the dialed number.

As another example, assume the user's calling plan covers all of his or her calls except for 911 calls. Thus, whenever the user dials a call (other than to 911), the user is provided with calling plan information. Advantageously, the user may keep up with his or her calling plan information. If the calling plan has a time function, then the user may keep up with the time function of the calling plan as the user makes use of telecommunications services.

Referring to FIG. 3, assume the user 48 has subscribed to a calling plan that allows the user 120 minutes of long distance service per month. Assume the user 48 uses a telephone 50 to dial a long distance call. As indicated by arrow 52, the information regarding the user's long distance call is picked up by the user's serving switch 54, also referred to as SSP 54. The SSP 54 may pick up on the user's long distance call as the result of a trunk-based trigger (such as a Network Busy) set in the SSP 54 with respect to the user's line.

As a result of the trigger 56, the SSP 54 pauses in the processing of the call to request instructions as indicated by arrow 58 from the SCP 42. The request may include call data such as originating number of the call, destination of the call, etc.

In an exemplary embodiment, the SCP 42 may respond to the request from the SSP 54 by using an SPA 60 to process the request and/or a database 40 (as indicated by arrows 62, 64) to obtain information relating to the request. For example, the information may include the calling plan information to be provided to the user 48. Once the SCP 42 has obtained the information, then the SCP 42 may provide instructions as indicated by arrow 66 to the SSP 54. The instructions may include calling plan information to be included in an announcement to the user 48. In response to receipt of the instructions, the SSP 54 may provide calling plan information in an announcement to the user 48 as indicated by arrow 68.

In an alternative embodiment, the SCP 42 may respond to the request from the SSP 54 as indicated by arrow 66 with instructions to the SSP 54 to obtain the calling plan information from an element such as the peripheral device 46 (also referred to as an intelligent peripheral or "element"). In response to the instructions, the SSP 54 may contact the peripheral device 46 for the calling plan information as indicated by arrow 70. The peripheral device 46 may provide the calling plan information to the SSP 54 as indicated by arrow 72. The SSP 54, in turn, then may announce the calling plan information to the user 48 as indicated by arrow 68.

In this alternative embodiment, as yet another alternative, instead of just contacting the peripheral device 46, the SSP 54 may connect the call from the user 48 to the peripheral device 46 as indicated by arrow 70. The peripheral device 46 then may announce the calling plan information to the user 48. Once the user 48 has been provided with the calling plan information by the peripheral device 46, then the connection of the call between the SSP 54 and the peripheral device 46 may be torn down.

In an alternative embodiment (not illustrated), as a result of the trigger 56, the SSP 54 pauses in the processing of the call to request instructions from the peripheral device 46 (or other appropriate device (not illustrated). The request may include call data such as originating number of the call, destination of the call, etc.

In an exemplary embodiment, the peripheral device 46 (or other appropriate device) may respond to the request from the SSP 54 by processing the request and consulting a database to obtain information relating to the request. For example, the information may include the calling plan information to be provided to the user 48. Once the peripheral device 46 has obtained the information, then the peripheral device 46 may provide instructions as indicated to the SSP 54. The instructions may include calling plan information to be included in an announcement to the user 48. In response to receipt of the instructions, the SSP 54 may provide calling plan information in an announcement to the user 48.

After the user 48 (or the call) has been provided with the calling plan information in an announcement from the SSP 54 (based on instructions from the SCP 42 or on information obtained from the peripheral device 46), or from the peripheral device 46, the user's call may be routed per the number dialed by the user 48.

For example, the user 48 may have dialed a long distance call to a friend 77. After the announcement of the calling plan information, the call is routed by SSP 54 through the PSTN/AIN to the SSP 76 serving the line associated with the device 78 used by the friend 77. Finally, the SSP 76 terminates the call, if appropriate, to the friend's line.

Advantageously, the user 48 did not have to take any special steps or actions to obtain information about the calling plan. The user 48 simply used a device (the telephone 50) associated with the user's calling plan to dial a call (within the calling plan) to a long distance number of a friend 77. In response to a determination that the user 48 was making the call, the inventions provided the user 48 with the calling plan information. Once the call has ended, information about the call may be provided to the element 46 or the SCP 42 (or its SPA 60 and/or database 40). The calling plan information may be updated based on the received information relating to the call.

CONCLUSION

From the foregoing description of the exemplary embodiments of the inventions and operation thereof, other embodiments will suggest themselves to those skilled in the art. Therefore, the scope of the inventions is to be limited only by the claims below and equivalents thereof.

What is claimed is:

1. In a network, a method to provide a user with information regarding a calling plan of the user, comprising:
   causing an element connected to the network to keep track of the information regarding the calling plan of the user;
   causing a switch to determine that the user has dialed a call to a number that fits the calling plan and, in response, causing the switch to request instructions regarding the call from a control point;
   causing the control point, in response to the request from the switch, to respond to the switch with instructions to contact the element for the information;
   causing the switch to contact the element including connecting the call to the element;
   causing the element, in response to the contact from the switch and the connection of the call, to provide the information regarding the calling plan of the user to the call without any input from the user specifically requesting the information and without dialing any number other than the number that fits the calling plan, and to indicate to the switch that the information has been provided to the call; and
   causing the switch, in response to the indication from the element that the information has been provided to the call, to disconnect the call from the element, and to route the call according to the number dialed by the user.

2. The method of claim 1, wherein the call comprises a toll call.

3. The method of claim 1, wherein the information regarding the calling plan of the user comprises a time function of the calling plan.

4. The method of claim 3, wherein the time function comprises time remaining until expiration of the calling plan.

5. The method of claim 3, wherein the time function comprises time used of the calling plan.

6. The method of claim 1, wherein the element comprises an intelligent peripheral.

7. In a network, a system to provide information regarding a calling plan of a user, comprising:
   an element accessible to a control point and operative to keep track of the information regarding the calling plan of the user;
   a switch operative to determine that a call is being made from an originating number associated with the calling plan of the user, and, in response, operative to request the control point for instructions regarding the call;
   the control point operative, in response to the request from the switch, to obtain the information regarding the calling plan of the user from the element, and operative to respond to the switch with the instructions including the information regarding the calling plan of the user; and the switch operative to respond to the instructions from the control point by providing the information to the call without any input from the user other than placing the call and without the user dialing any number other than placing the call.

8. The system of claim 7, wherein the switch is further operative to route the call after providing the information to the call.

9. The system of claim 7, wherein the call comprises a toll call.

10. The system of claim 7, wherein the switch is operative to determine that the call is being made to a number that fits the calling plan of the user.

11. The system of claim 7, wherein the information regarding the calling plan of the user comprises a time function of the calling plan.

12. The system of claim 11, wherein the time function comprises time remaining until expiration of the calling plan.

13. The system of claim 11, wherein the time function comprises time used of the calling plan.

14. The system of claim 7, wherein the element comprises an intelligent peripheral.

15. A method to provide a user with information regarding a calling plan of the user, comprising:
    assigning the user an account related to the calling plan and associating the information regarding the calling plan of the user with the account;
    determining that a call is originating from a number associated with the calling plan of the user;
    in response to the determination, obtaining the information associated with the account; and
    providing the call with the information without any input from the user other than placing the call and without the user dialing any number other than placing the call.

16. The method of claim 15, wherein the call is provided with the information prior to routing of the call.

17. The method of claim 15, further comprising:
    after providing the call with the information, routing the call to a terminating number dialed by the user.

18. The method of claim 15, wherein the information comprises a time function of the calling plan;
    wherein obtaining the information comprises obtaining the time function; and
    wherein providing the user with the information comprises providing the user with the time function.

19. The method of claim 18, wherein the time function comprises time remaining until expiration of the calling plan.

20. The method of claim 18, wherein the time function comprises time used of the calling plan.

21. The method of claim 15, wherein the call comprises a toll call.

22. The method of claim 17, further comprising:
    updating the account regarding the calling plan of the user with data on the call so as to result in updated information regarding the calling plan of the user being associated with the account.

23. The method of claim 22, wherein the data comprises length of the call; and
    wherein the updated information comprises an updated time function based on the length of the call.

* * * * *